(No Model.)
W. B. SWAN.
DRAW SHAVE.
No. 386,855. Patented July 31, 1888.
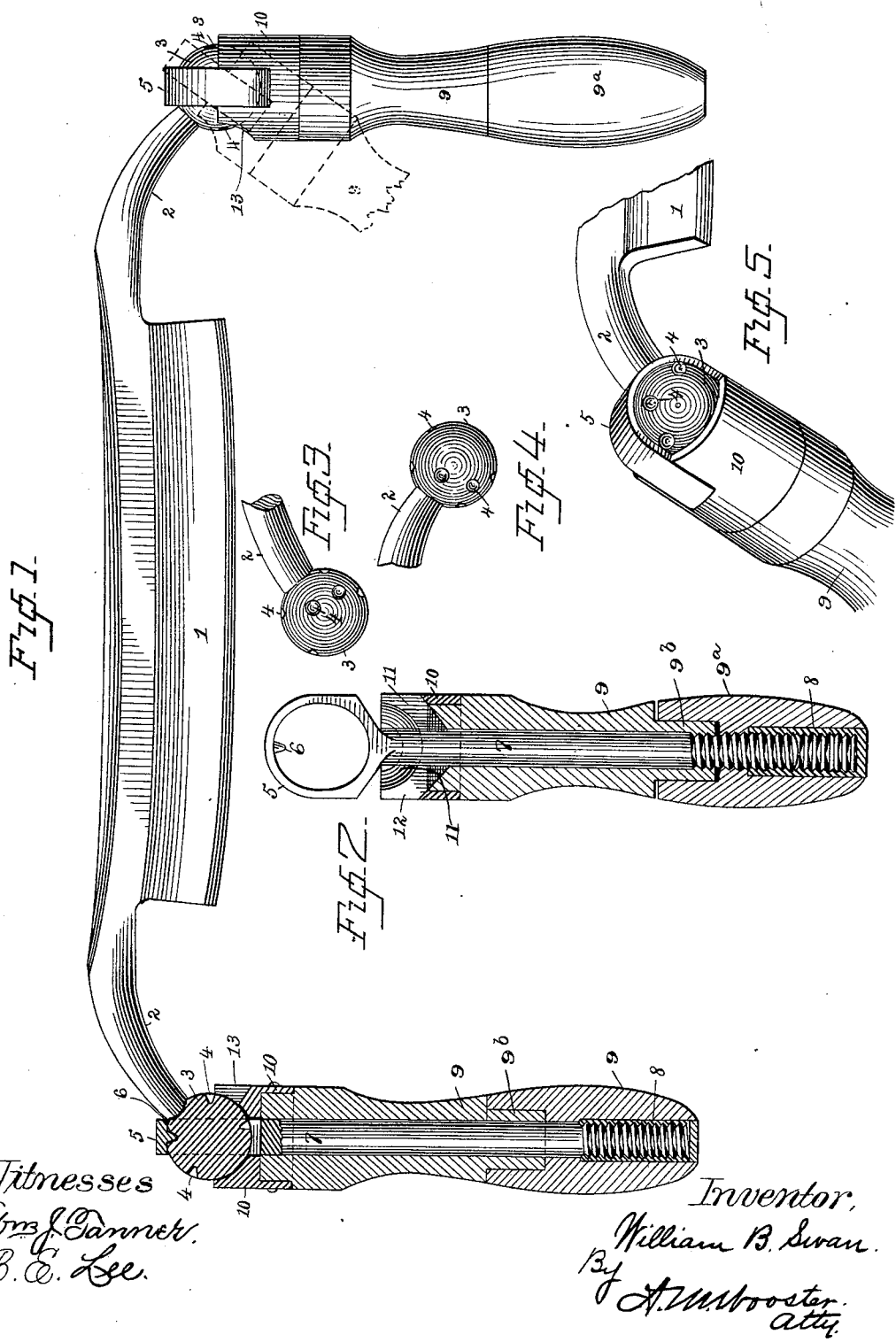
Witnesses
Wm. J. Tanner.
B. E. Lee.
Inventor,
William B. Swan.
By A. M. Wooster.
Atty.

UNITED STATES PATENT OFFICE.

WILLIAM B. SWAN, OF SEYMOUR, CONNECTICUT.

DRAW-SHAVE.

SPECIFICATION forming part of Letters Patent No. 386,855, dated July 31, 1888.

Application filed February 20, 1888. Serial No. 264,593. (No model.)

*To all whom it may concern:*

Be it known that I, WILLIAM B. SWAN, a citizen of the United States, residing at Seymour, in the county of New Haven and State of Connecticut, have invented certain new and useful Improvements in Draw-Shaves; and I do hereby declare the following to be a full, clear, and exact description of the invention, such as will enable others skilled in the art to which it appertains to make and use the same.

My invention has for its object to provide drawing-knives and other classes of tools with handles capable of universal adjustment. With this end in view I have devised the novel construction of which the following description, in connection with the accompanying drawings, is a specification, numbers being used to denote the several parts.

Figure 1 is an elevation of a drawing-knife with my invention applied, one of the handles and the ball at that end of the shank being in section; Fig. 2, a longitudinal section of a handle, the loop and its shank being in elevation and the view at right angles to that in Fig. 1. Figs. 3 and 4 are detail views of the balls at the opposite ends of the blade-shank, and Fig. 5 is a perspective showing a handle adjusted obliquely to the blade.

1 denotes the blade, and 2 the shanks, of an ordinary drawing-knife. The general style of the blade and shape of the shanks are not of the gist of my invention, and may be varied to suit the taste of the manufacturer or the demands of the trade. At the end of each shank I provide a ball, 3, which is provided with holes or recesses 4. Each of these balls is embraced by a metallic loop, 5, having a lug or projection, 6, upon the inner side at its outer end, which is adapted to engage any of the holes or recesses. Each loop is provided with a shank, 7, which extends down into the body of the handle, and is screw-threaded to engage a nut, 8, at the base of the handle.

The handle is made in two parts, which I have denoted by 9 and 9ª. One of these parts is provided with a tongue, 9ᵇ, which passes into a corresponding socket in the other part. The line of division is preferably about midway the length of the handle, as shown in the drawings.

At the upper end of each handle is a ferrule, 10, which is provided with a socket, 11, to receive the ball at the end of the blade-shank, with a slot, 12, extending through it, which receives the loop when it is drawn inward, and with a notch, 13, to receive the shank of the blade when the handles are set inward at an acute angle to the blade.

It will of course be understood that any number of holes or recesses may be provided in the balls to be engaged by lug 6, and it will furthermore be seen that when the lower portion of the handle is turned backward, as shown in Fig. 2, the loop is free to be moved outward, which will permit the handle to be set at any desired angle to the blade, an important advantage of my present invention being that it permits of universal adjustment of the handles—that is to say, the handles may be swung around to any desired position relatively to the blade, may be swung in or out, or may be set at any oblique angle relatively to the cutting-edge that the exigencies of the work may require—as, for example, in Fig. 5.

It will furthermore be seen that my invention makes blades and handles readily interchangeable.

The operation, when it is desired to change the adjustment of the handles relatively to the blade, is simply to turn the lower portion of each handle backward until the loop is free to pass out from socket 11 sufficiently to allow the ball to slip backward from lug 6. When the handles have been adjusted at the desired angle, the lower portion of each handle is turned forward again. The engagement of the thread of shank 7 with nut 8 draws the loop and ball down into the socket, the base of the loop passing into slot 12, so that all of the parts are firmly held in the position to which they have been adjusted.

It will of course be understood that the details of construction may be varied greatly without departing from the principle of my invention.

I claim—

1. In a tool-handle, the combination, with a blade having a ball at its outer end provided with holes or recesses, of a loop having a lug on its inner side, at the outer end, adapted to engage the holes or recesses, and a handle having a socket at its outer end which receives the ball when the loop is drawn inward, whereby the handle may be locked at any adjustment relatively to the blade.

2. The combination, with a blade having balls at its outer ends provided with holes or recesses, of loops having lugs on their inner sides, at the outer ends, adapted to engage said holes or recesses, and shanks threaded at their lower ends, and handles formed in two parts, the upper parts being provided with sockets to receive the balls when the loops are drawn inward and the lower portions provided with nuts which are engaged by the threaded portions of the shanks of the loops, as and for the purpose set forth.

3. The combination, with a blade having balls at its opposite ends provided with holes or recesses, of loops having lugs which engage said recesses, shanks threaded at their lower ends, and handles formed in two portions, the upper portions being provided with sockets to receive the balls and slots to receive the loops and the lower portions provided with nuts which are engaged by the threaded portions of the shanks, substantially as described.

4. The combination, with a blade having a ball provided with holes at the end of its shank, of a loop having a lug to engage said holes and a shank threaded at its lower end, and a two-part handle, the upper portion of which is provided with a recess to receive the ball and a slot to receive the loop and the lower portion provided with a nut which is engaged by the threaded portion of the shank, substantially as described.

In testimony whereof I affix my signature in presence of two witnesses.

WILLIAM B. SWAN.

Witnesses:
JOHN ROBERTS,
LEWIS A. CAMP.